United States Patent [19]

Kooi

[11] 4,254,925
[45] Mar. 10, 1981

[54] THEODOLITE CENTER MOUNTING MEANS

[75] Inventor: J. Peter E. Kooi, Loudonville, N.Y.

[73] Assignee: Keuffel & Esser Company, Morristown, N.J.

[21] Appl. No.: 67,981

[22] Filed: Aug. 20, 1979

[51] Int. Cl.³ .......................................... F16M 11/12
[52] U.S. Cl. ................................... 248/180; 248/179; 248/346; 248/550
[58] Field of Search ............... 248/180, 187, 184, 178, 248/179, 188.2, 186, 346, 550; 108/137, 139; 403/30

[56] References Cited

U.S. PATENT DOCUMENTS

| | | | |
|---|---|---|---|
| 1,948,508 | 2/1934 | Carleton | 248/180 |
| 3,823,772 | 7/1974 | Lavering et al. | 403/30 |
| 3,931,947 | 1/1976 | Tagnon | 248/180 |
| 3,937,433 | 2/1976 | Portaleoni | 248/550 |
| 4,157,802 | 1/1979 | May, Jr. | 248/346 |

Primary Examiner—James T. McCall
Attorney, Agent, or Firm—Lionel N. White

[57] ABSTRACT

Means for conjointly mounting center members of dissimilar metals for stable concentric rotation about a theodolite spindle comprises a plurality of radially-extending guide grooves on one of the members disposed regularly about the axis of the spindle, and a like plurality of support elements affixed to another of the center members and similarly disposed about the spindle axis to seat respectively in the guide grooves. The support elements being thus limited by the guide grooves to precise radial movement, any dissimilar thermal expansions of the center members result in relative movement between them which is concentric with the spindle axis.

9 Claims, 5 Drawing Figures

THEODOLITE CENTER MOUNTING MEANS

BACKGROUND

A geodetic instrument, such as a theodolite, transit, or the like, generally comprises an alidade base and spindle assembly upon which the instrument body, including the standards and telescope, is mounted for rotation about the vertical spindle axis. For purposes of stability and precision the base assembly of such an instrument has commonly been made of steel with the body being mounted directly to the bearing-mounted rotary foundation members in any convenient manner.

In the higher order instruments from which greater precision is expected it has been the practice to utilize metals of substantially similar coefficients of expansion, such as stainless steel and brass, throughout the alidade structure in order to avoid imbalances and distortions due to temperature changes. Particularly susceptible to significant error resulting from the vagaries of expansions are the rotation centers, such as the vertical spindle assembly and the telescope trunnion bearing support assembly.

More recently, the profusion of assemblies and parts comprising the advanced theodolite instrument have led to a requirement for the increased use of lighter structural materials, such as aluminum, in the interest of both economy and maintaining a readily manageable instrument weight. Since there has remained the necessity of utilizing steel in some parts, such as the rotation centers, to ensure precision and instrument longevity, a definite problem has been realized in the interfacing of the steels and aluminums in the instrument structure in such a manner as to prevent errors due to the widely differeing coefficients of expansion of these types of materials.

In some instances attempts have been made to solve the problem by brute force, as by firmly bolting together the parts of dissimilar structural material; however, not only were the expansion stresses sufficiently great that errors nonetheless appeared, but permanent damage to the affected assemblies often resulted. The present invention, on the other hand, provides a means for interfacing the critical theodolite parts of dissimilar material which guides, rather than resists, movement caused by differences in rates of thermal expansion in order to maintain the concentricity of such parts with respect to the axes of rotation. In this manner the previously uncontrollable errors are eliminated from even the higher order instruments.

SUMMARY

According to the present invention a first member, normally of steel, brass, or other relatively hard material is mounted by suitable bearing means concentrically with a rotational axis in the instrument, i.e. either that of the alidade spindle or telescope trunnion. A second member of significantly different coefficient of expansion, such as aluminum, is arranged concentrically with the axis and the first member together with which it forms the interface between the structures of greater and lesser thermal expansion.

The interface members may be of plate or annular configuration and generally present closely adjacent planar faces situated perpendicular to the rotational axis. In the face of one of the members, preferably the harder, are formed a plurality of grooves extending radially with respect to the rotational axis and disposed regularly about the axis. A like plurality of extending support elements, such as studs, are affixed to the second interface member and located so as to individually seat at their distal ends in a near perfect fit within each of the radial grooves.

Sufficient axial force is applied to the interface members, as by screw means or the mere weight of a supported structure, to maintain the stud ends in firm contact with the guide grooves, yet allow radial movement therebetween upon thermal expansion of the members. In this manner the interface members are constrained to retain their concentric arrangement, thereby ensuring the accurate disposition, with respect to rotational axes, of other structural units of the instrument.

DRAWINGS

DESCRIPTION

Figure 1:
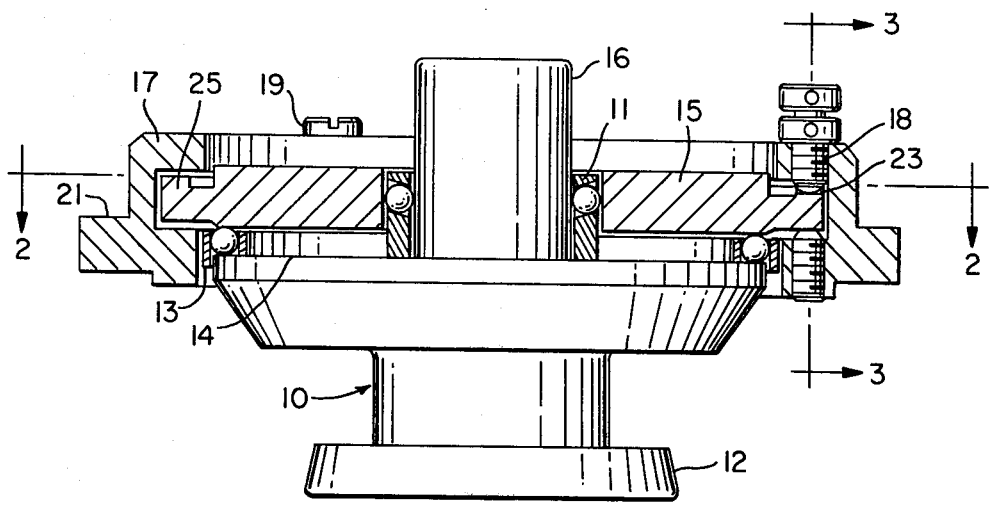
FIG. 1 is an elevational view, in section along the line 1—1 in FIG. 2, depicting a theodolite base assembly comprising a center mounting means according to the present invention.

A preferred embodiment of the present invention is shown in FIG. 1 as comprising a center assembly for a theodolite geodetic instrument. The assembly includes a base generally shown at 10 as comprising a base footing 12, a bearing platform 14, and an alidade spindle 16. The base 10 is normally made of steel, or other metal of similar hardness, since, as shown in FIG. 1, platform 14 and spindle 16 comprise races for bearing assemblies 13, 11 respectively. These bearings are completed in the embodiment shown by a steel race plate 15. As will be apparent from the embodiment shown, plate 15 is constrained by bearings 13, 11 for precise concentric rotation about the vertical axis of spindle 16.

The usual standards and telescope of a theodolite instrument are not shown in the present drawings, rather there is depicted only a foundation ring 17 to which the standards of the instrument may be affixed such as at annular support ledge 21 by means of bolts or other fasteners. In the interest of economy of weight, it is preferred that the theodolite instrument be constructed for the most part of lighter alloys, of aluminum for example, and, since the standards or body casting will be rigidly affixed to foundation ring 17, that foundation ring member is likewise constructed of the lighter alloys.

It is thus this combination of alloys of aluminum utilized in the instrument body structures and the harder metals of stainless steel or brass utilized in the base and spindle members of the instrument which lead to the earlier mentioned problem of interfacing these materials of substantially different coefficient of thermal expansion in such a manner as to ensure against inaccurate displacements or stresses generated between the instrument base assembly and the body and standard structures as a whole during periods of significant temperature change.

Such as interface provided by the present invention comprises an outer rim or flange portion 25 of race plate 15 in which there are formed a plurality of axially extending grooves 23 which will serve as support guides for stud members 18, 19 affixed to foundation ring 17. The actual interface between these major base and body assemblies of the theodolite instrument is constituted by the juncture of the guide groove 23, which in the present embodiment is of cylindrical shape, and the cylindrical ends of the supporting studs which engage the groove in a near perfect fit, thus establishing a precise line of available sliding displacement therebetween along the longitudinal axis of the cylindrical groove.

Figure 2:
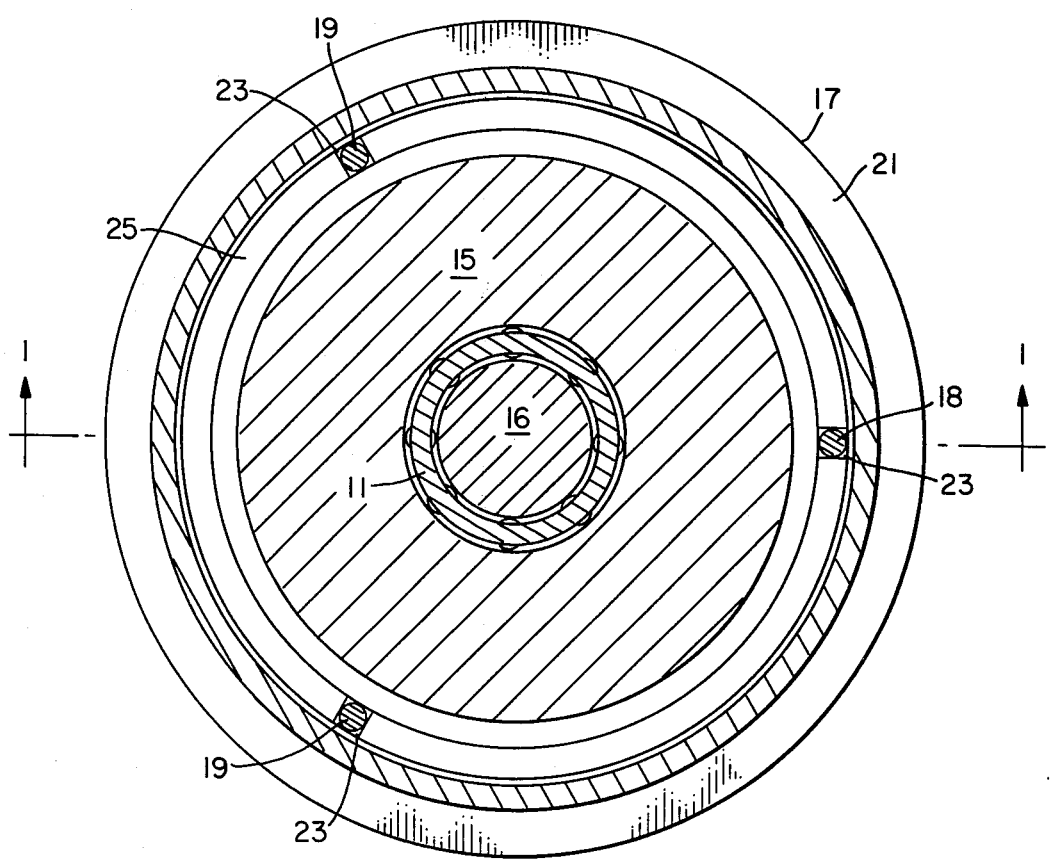
FIG. 2 is a plan view, taken in section along 2—2 in FIG. 1, of the theodolite center mounting means.
Figure 3:
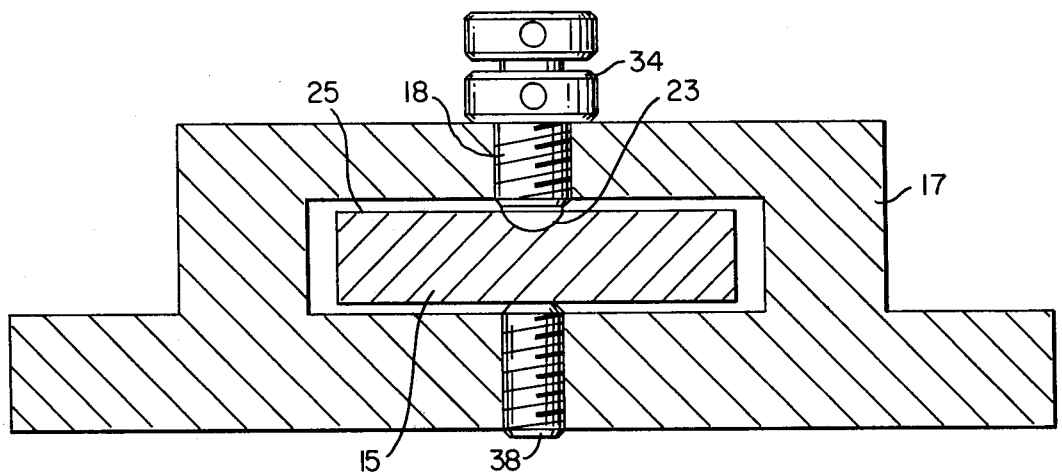
FIG. 3 is an elevational view, in section along 3—3 in FIG. 1, showing in greater detail the mounting means of the invention.

As shown in FIG. 2, it is preferred that the guide grooves 23 be three in number and disposed equidistant along flange 25 in order to establish the particularly stable three-point support for foundatin ring 17 upon race plate flange 25. Greater numbers in the plurality of supporting studs and matching grooves may, of course, be employed; however, the geometry of the equilateral triangle is the most practical in its simple stability.

While the support stud elements may be affixed to foundation ring 17 in a stationary manner as in the form of screws 19, it is preferred to include at least one stud of the type shown at 18 as an adjustable screw or bolt having a lock nut 34 by means of which the extension of the stud member may be varied at will in order to adjust the vertical centerline of the theodolite body with respect to the vertical axis of spindle 16. Although the weight of the theodolite body will normally be sufficient to maintain a close contact between the support studs and guide grooves 23, a backup element such as set screw 38 may be employed to ensure such firm seating on occasions when the body weight is displaced as by lifting or tilting the instrument.

As will be apparent from the described drawings, the heavier metal race plate 15 will normally expand, and contract, a given amount with temperature changes; however, being constrained to concentricity with spindle 16 by bearing 11, such expansion will be radial and regular over the whole of plate 15. The expansion of lighter alloy foundation ring 17 on the other hand will be a significantly different degree. Such expansion may be presumed, however, to be regular and in a radial direction so as to enlarge the diameter of ring 17.

As noted, the weight of the instrument body, or the cooperative adjustment between the stud member and backup set screw 38, is such as to ensure firm contact between stud end and guide groove 23, yet allow for a precise sliding movement of the stud end in the groove. Further, it will be seen that the three-point arrangement shown in FIG. 2 provides not only for a stable horizontal datum plane of support for the theodolite body, but also establishes a kinematic arrangement whereby, due to the radial disposition of grooves 23, each pair of supporting studs is constrained to limit the reactive expansive force upon the third stud to that radial direction established by the longitudinal axis of its associates guide groove 23. In this manner each of the support studs is displaced equally in its respective radial direction and the concentricity of foundation ring 17 with respect to the vertical axis of spindle 16 and, as a result, that of race plate 15 is maintained. Stresses and possible distortions of structural members which might otherwise result from an immobile mounting of foundation ring 17 directly and firmly upon race plate 15 are thus avoided by allowing movement between these two members; however, since the concentricities of the members with respect to spindle 16 and each other are maintained, no errors in rotational displacement result from such relative movement.

Figures 4, 5:
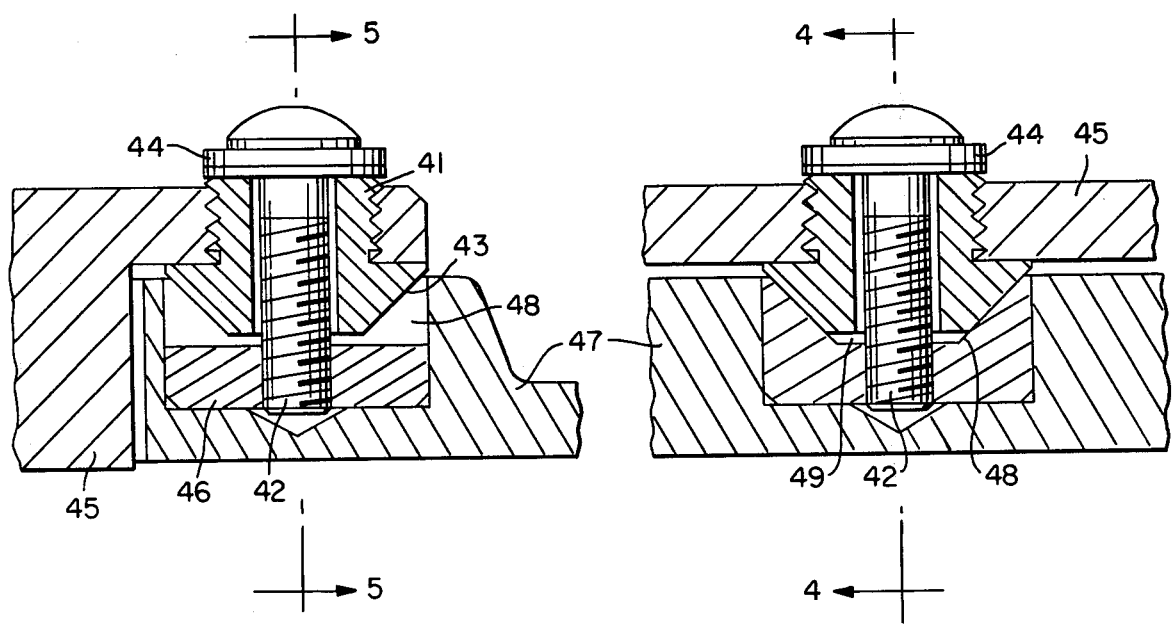
FIG. 4 is an elevational view, in section along 4—4 in FIG. 5, showing another embodiment of the mounting means of the present invention.
FIG. 5 is another elevational view, in section along 5—5 in FIG. 4, of the embodiment of FIG. 4.

Another embodiment of the present invention is shown at FIGS. 4 and 5 which depict a different style of interface elements than those previously described. In this embodiment the interfacing between stainless steel member 45 and aluminum alloy member 47 is effected by means of a steel insert 46 which is press fit into member 47 and comprises a plane-faced truncated V-groove 49 of which the faces 48 extend precisely parallel to the radius from the center of rotation. Such center of rotation may be that of the telescope trunnion in a theodolite instrument and in an application of this type member 45 would represent an element of the axle bearing while member 47 would be the aluminum alloy standard or body wall of the instrument.

Affixed to member 45 is a threaded steel stud 41, the extension of which is in the shape of a truncated cone. The conical surface 43 of stud 41 forms a near perfect fit with the plane walls 48 of V-groove insert element 46 and are thus precisely guided in the radial direction upon relative movement between members 45, 47. A bolt 42 with washer 44 exerts sufficient force between stud 41 and insert 46 to ensure firm seating between surfaces 42, 48, yet allows movement between those surfaces upon thermal displacement between members 45, 47. The bore of stud 41 which accommodates bolt 42 is sufficiently oversized to allow for any expected extent of such movement. In the manner previously described the plurality of guide groove mountings for the bearing members cooperate in their regular expansive movement radially of the axle center to ensure against displacement of the axis of rotation with respect to the instrument body and, particularly, the vertical axis of the spindle of the alidade.

The depicted embodiments of the present invention need not, of course, be relegated to utilization in the respective center mounting assemblies described, but these and other forms of radially disposed guide groove and extending stud combinations may be employed wherever it is desired to interface structural members of dissimilar coefficients of expansion while retaining the relative attitudes of the members, such as in constant concentricity about a center of rotation.

What is claimed is:

1. Means for conjointly mounting in facing relation a pair of generally planar members of different coefficient of expansion, said means comprising:

(a) a plurality of straight groove elements disposed on a planar face of the first of said members about an axis perpendicular to said face, said groove elements being oriented with their longitudinal axes coincident with different radii centered upon said perpendicular axis;

(b) a plurality of support elements of substantially equal length extending from the opposing planar face of the other of said members, said support elements having distal ends conforming to the cross-sectional shape of said groove elements and being so located as to seat respectively in different ones of said groove elements in a near perfect fit; and (c) means maintaining contact between said groove elements and said support element distal ends, yet allowing sliding movement between the contacting faces of said elements, whereby planar movement between said members during expansion or contaction of said members occasioned by changes in temperature is constrained by the contacting groove and support elements to directions along said radially-extending longitudinal groove axes, thereby maintaining said planar members in concentricity about said perpendicular axis.

2. Mounting means according to claim 1 wherein said groove element axes are coincident with substantially equiangularly spaced radii.

3. Mounting means according to claim 2 wherein the contacting portions of the respective groove and support element couples are substantially equidistant from said perpendicular axis.

4. Mounting means according to claim 3 wherein:
(a) said first planar member comprises an annular body associated concentrically with rotary bearing means about said perpendicular axis;
(b) said other member comprises an annular body arranged in substantial concentricity with said first member about said perpendicular axis; and
(c) said mounting means further comprises an axle arranged coaxially with said perpendicular axis and engaging said bearing means for relative rotary motion between said first planar member and said axle.

5. Mounting means according to claim 4 wherein said axle comprises the vertical spindle of a geodetic instrument alidade.

6. Mounting means according to claim 4 wherein said axle comprises the trunnion of a geodetic instrument telescope.

7. Mounting means according to claim 1 wherein said plurality of support elements numbers three and at least one of said support elements comprises means for varying the extended length thereof with respect to said opposing planar face, whereby the planar attitude of said opposing face with respect to said perpendicular axis may be varied.

8. Mounting means according to claim 7 wherein said support element distal ends are spherical and said groove elements are of circular segment cross-section.

9. Mounting means according to claim 7 wherein said support element distal ends are conical and said groove elements are of triangular cross-section.

* * * * *